United States Patent
Perry et al.

(10) Patent No.: US 6,868,420 B2
(45) Date of Patent: Mar. 15, 2005

(54) METHOD FOR TRAVERSING QUADTREES, OCTREES, AND N-DIMENSIONAL BI-TREES

(75) Inventors: Ronald N. Perry, Cambridge, MA (US); Sarah F. Frisken, Cambridge, MA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 433 days.

(21) Appl. No.: 10/209,302

(22) Filed: Jul. 31, 2002

(65) Prior Publication Data

US 2004/0024779 A1 Feb. 5, 2004

(51) Int. Cl.[7] ................................................. G06F 7/00
(52) U.S. Cl. ........................................... 707/100; 707/2
(58) Field of Search .................. 707/1–8, 10, 100–102, 707/104.1, 200, 203–205; 711/100, 117–119, 200–207; 715/848, 855

(56) References Cited

U.S. PATENT DOCUMENTS

| | | | |
|---|---|---|---|
| 5,459,831 A | | 10/1995 | Brewer et al. .............. 395/155 |
| 5,937,190 A | * | 8/1999 | Gregory et al. ............. 717/131 |
| 6,401,038 B2 | * | 6/2002 | Gia ............................ 701/301 |

OTHER PUBLICATIONS

George Cho, "A self Teaching Guide for GIS", Feb. 12, 2001,http://64.233.161.104/search?q=cache:N7Sm3oUthUkJ:www.rz.uni-hohenheim.de/anw/programme/gis/GIS_Manual_self_learning.pdf+%22locational+code%22+copyright+2001&hl=en.*

Pritchard, "Direct Access Quadtree Lookup," Game Programming Gems 2, ed. DeLoura, Charles River Media, Hingham, MA, 2001.

Stolte and Caubet, in "Discrete Ray–Tracing of Huge Voxel Spaces," Computer Graphics Forum, 14(3), pp. 383–394, 1995.

Bhattacharya in "Efficient Neighbor Finding Algorithms in Quadtree and Octree," M.T. Thesis, Dept. Comp. Science and Eng., India Inst. Technology, Kanpur, 2001.

Havran, "A Summary of Octree Ray Traversal Algorithms," Ray Tracing News, 12(2), pp. 11–23, 1999.

* cited by examiner

Primary Examiner—Greta Robinson
Assistant Examiner—Harold E. Dodds, Jr.
(74) Attorney, Agent, or Firm—Dirk Brinkman; Andrew J. Curan

(57) ABSTRACT

A method traverses a bi-tree stored in a memory to locate application specific data stored in the memory and associated with the bi-tree. The bi-tree comprises a spatial partitioning of an N-dimensional space into a hierarchy of cells. Starting from a root cell enclosing the N-dimensional space, each cell is successively and conditionally partitioned into $2^N$ child cells along the cell's N mid-planes. Each cell of the bi-tree has associated characteristics comprising the application specific data and child cells are indexed directly from a parent cell. First, a set of locational codes, a cell of the bi-tree, and a termination condition are specified. Next, the characteristics of the cell are tested to see if they satisfy the termination condition. If the termination condition is not satisfied, an arithmetic operation on the set of locational codes is performed to directly index a next cell to be tested. Otherwise, the cell identifies a target cell. Finally, the application specific data of the target cell is retrieved from the memory.

24 Claims, 7 Drawing Sheets

METHOD FOR TRAVERSING QUADTREES, OCTREES, AND N-DIMENSIONAL BI-TREES

FIELD OF THE INVENTION

This invention relates generally to tree-structured data representations, and more particularly to locating spatial data stored in quadtrees, octrees, and their N-dimensional counterparts.

BACKGROUND OF THE INVENTION

Tree-structured data representations are pervasive. Because of their long history and many different forms and uses, there are a large variety of "trees" that appear superficially alike, or that have similar names, even though they are quite different in detail and use.

Therefore, a "bi-tree," as defined herein, is a spatial partitioning of an N-dimensional space into a hierarchy of cells. A root cell, enclosing the N-dimensional space, is conditionally partitioned into $2^N$ equally sized child cells along its mid-planes. Each child cell is then successively and conditionally partitioned in a similar manner.

Each cell of the bi-tree has associated characteristics comprising application specific data such as graphical elements, e.g., triangles, of a graphical object, e.g., a three-dimensional triangle mesh. Child cells in the bi-tree are indexed directly from their parent cell. Bi-trees can be fully populated, or sparse. In fully populated bi-trees, each cell is partitioned down to a deepest common level; in sparse bi-trees only selected cells are partitioned to reduce storage requirements.

FIG. 1 shows an example bi-tree 100 as defined herein. Although the example bi-tree 100 is a quadtree, i.e., a two-dimensional bi-tree, the method according to the invention can be extended to octrees, i.e., three-dimensional bi-trees, as well as lower and higher dimensional bi-trees because our method treats each dimension independently.

Cells branch from a root cell 101, through intermediate cells 102, to leaf cells 103. Typically, the cells are associated with application specific data and characteristics, e.g., a cell type for region quadtrees, or object indices for point quadtrees. The child cells are indexed 110 directly from their parent cell. Direct indexing can be done by ordering the child cells or pointers to the child cells in a memory.

A depth of the bi-tree 100 is $N_{LEVELS}$. The level of the root cell 101 is $LEVEL_{ROOT}=N_{LEVELS}-1$. The level of a smallest possible cell is zero. The bi-tree 100 is defined over a normalized space $[0, 1] \times [0, 1]$. Similarly, an N-dimensional bi-tree is defined over $[0, 1]^N$. Although this may seem restrictive, in practice most spatial data can be represented in this normalized space by applying transformations to the coordinates of the data.

Quadtrees and octrees are used in many diverse fields such as computer vision, robotics, and pattern recognition. In computer graphics, quadtrees and octrees are used extensively for storing spatial data representing 2D images and 3D objects, see Samet, "The Quadtree and Related Hierarchical Data Structures," Computing Surveys, Vol. 16, No. 2, pp. 187–260, June 1984, and Martin et al., "Quadtrees, Transforms and Image Coding," Computer Graphics Forum, Vol. 10, No. 2, pp. 91–96, June 1991.

As shown in FIG. 2, quadtrees successively partition a region of space into four equally sized quadrants, i.e., cells. Starting from a root cell, cells are successively subdivided into smaller cells under certain conditions, such as when the cell contains an object boundary (region quadtree), or when the cell contains more than a specified number of objects (point quadtree). Compared to methods that do not partition space or that partition space uniformly, quadtrees and octrees can reduce the amount of memory required to store the data and improve execution times for querying and processing the data, e.g., collision detection and rendering.

Managing information stored in a bi-tree generally requires three basic operations: point location, region location, and neighbor searches.

Point location finds a leaf cell 201 containing a given point 200. For example, a quadtree that stores geographical data, such as city locations, is partitioned according to geographical coordinates, i.e., longitude and latitude. Point location can be used to find cities near a given geographical coordinate, i.e., the point 200.

Region location finds a smallest cell or set of cells that encloses a specified rectangular region 210 represented by a minimum vertex $v_0$ 211 and a maximum vertex $v_1$ 212. With the geographical quadtree example, region location can be used to determine all the cities that are within a given range of specified geographical coordinates.

A neighbor search finds a cell, in a specified direction, that is adjacent to a given cell. In the geographical quadtree, point location can be combined with neighbor searching to first locate a cell containing a given city and then to find nearby cities in a given direction. In all of these operations, the bi-tree is traversed by following pointers connecting the cells.

A fourth operation, called ray tracing, is used by graphics applications to render three-dimensional models on a display, see Foley et al., "Computer Graphics Principles and Practice," Addison-Wesley, 1992. In these applications, graphical elements comprising a scene are placed in leaf cells of an octree. Ray tracing requires a sequential identification of leaf cells along a ray. One method for identifying these leaf cells combines point location and neighbor searching.

Traditional point location operations in a bi-tree require a downward branching through the bi-tree beginning at the root node. Branching decisions are made by comparing each coordinate of a point's position to a mid-plane position of a current enclosing cell.

Traditional neighbor searching in a bi-tree requires a recursive upward branching from a given cell to a smallest common ancestor of the given cell and a neighboring cell, and then a recursive downward branching to locate the neighbor. Each branch in the recursion relies on comparing values that depend on the current cell and its parent. Typically, the values are stored in tables.

Prior art point location, region location, and neighbor searching are time consuming because Boolean operations, i.e., comparisons, are used. Boolean operations are typically implemented by predictive branching logic in modern CPUs. Predictive branching will stall the instruction pipeline on incorrectly predicted branch instructions, see Knuth, The Art of Computer Programming, Volume 1, Addison-Wesley, 1998, and Knuth, MMIXware: A RISC Computer for the Third Millennium, Springer-Verlag, 1999.

Mispredictions occur frequently for traditional tree traversal operations because previous branch decisions generally have no relevance to future branch decisions, see Pritchard, "Direct Access Quadtree Lookup," Game Programming Gems 2, ed. DeLoura, Charles River Media, Hingham, Mass., 2001.

In addition, traditional neighbor searching methods are recursive. Recursion increases overhead as a result of maintaining stack frames and making function calls. Also, prior art neighbor searching methods use table lookups which require costly memory accesses in typical applications. Finally, prior art neighbor searching methods are limited only to quadtrees and octrees and it is exceedingly complex to extend these methods to higher dimensional bi-trees.

FIG. 3 shows a typical prior art point location operation 300. The operation begins with a position of a given point 301 and a starting cell 302. First, characteristics (C) 303 associated with the cell 302 are tested 310. If true (T), then the cell 302 is a target cell 309 containing the point 301. If false (F), then each coordinate of the position of the point 301 is compared 320 to a corresponding mid-plane position of the cell 302. The comparisons 320 allow one to compute 330 an index to a next (child) cell 304 to be tested.

As stated above, the comparisons 320 require Boolean operations. For an N-dimensional bi-tree, at least N such Boolean operations are required for each cell visited during the traversal of the bi-tree. As stated above, these Boolean operations are likely to stall the instruction pipeline thereby degrading performance.

Pritchard, in "Direct Access Quadtree Lookup," describes a region location operation for quadtrees that uses locational codes of the x and y boundaries of the bounding box of a region. Pritchards's quadtree is not a bi-tree under the above definition, because his child cells cannot be indexed directly from a parent cell.

That method operates on a hierarchy of regular arrays of cells, where each level is fully subdivided and contains four times as many cells as a previous level. His two-dimensional representation of spatial data requires a significant amount of memory, and would require even more memory for three- and higher-dimensional spatial data. Hence, that method is impractical for many applications.

Pritchard's method has two steps. First, that method uses locational codes of the left and right x boundaries and the top and bottom y boundaries of a region bounding box to determine a level of an enclosing cell. Then a scaled version of a position of a bottom-left vertex of the region bounding box is used to index into a regular array at this level.

Traditionally, locational codes have been used with "linear quadtrees" and "linear octrees", see H. Samet, "*Applications of Spatial Data Structures: Computer Graphics, Image Processing, GIS*," Addison-Wesley, Reading, Mass., 1990. Linear quadtrees and linear octrees are not bi-trees under our definition. Rather, linear quadtrees and linear octrees are comprised of a list of leaf cells where each leaf cell contains its interleaved locational code and other cell specific data. In general, linear quadtrees and linear octrees are more compact than bi-trees, e.g., they do not represent intermediate cells and they do not provide explicit links for direct indexing, at the expense of more costly and complicated processing methods.

Locational codes for linear quadtrees and linear octrees interleave bits that comprise coordinate values of a cell's minimum vertex such that linear quadtrees use locational codes of base 4 (or 5 if a "don't care" directional code is used) and linear octrees use locational codes of base 8 (or 9), see H. Samet, "*Applications of Spatial Data Structures: Computer Graphics, Image Processing, GIS*," Addison-Wesley, Reading, Mass., 1990.

In computer graphics and volume rendering, ray tracing methods often make use of octrees to accelerate tracing rays through large empty regions of space. Those methods determine non-empty leaf cells along a ray passing through the octree and then process ray-surface intersections within these cells.

There are two basic approaches for tracing a ray through an octree: bottom-up and top-down. Bottom-up methods start at the first leaf cell encountered by the ray and then use neighbor finding techniques to find each subsequent leaf cell along the ray. Top-down methods start from the root cell and use a recursive procedure to find offspring leaf cells that intersect the ray. An extensive summary of methods for traversing octrees during ray-tracing is described by Havran, "*A Summary of Octree Ray Traversal Algorithms*," Ray Tracing News, 12(2), pp. 11–23, 1999.

Stolte and Caubet, in "*Discrete Ray-Tracing of Huge Voxel Spaces*," Computer Graphics Forum, 14(3), pp. 383–394, 1995, describe a top-down ray tracing approach that uses locational codes for voxel data sets stored in an octree. They first locate a leaf cell containing a point where a ray enters the octree. Then, for each leaf cell without a ray-surface intersection, a 3D DDA is used to incrementally step along the ray, in increments proportional to a size of a smallest possible leaf cell, until a boundary between the leaf cell and a neighboring next cell is encountered. The neighboring next cell is then found by popping cells from a recursion stack to locate a common ancestor of the leaf cell and the neighboring next cell and then traversing down the octree using their point location method. However, their method requires Boolean comparisons and thus suffers from the misprediction problems described above.

Therefore, it is desired to provide a traversal method for N-dimensional bi-trees that improves performance over the prior art by avoiding Boolean operations and eliminating recursion and memory accesses for table lookup, without increasing memory requirements.

SUMMARY OF THE INVENTION

The invention provides an efficient traversal method for bi-trees, e.g., quadtrees, octrees, and their N-dimensional counterparts. The method uses locational codes, is inherently non-recursive, and does not require memory accesses for table lookup. The method also reduces the number of mispredicted comparisons. The method includes procedures for point location, region location, neighbor searching, and ray tracing.

DETAILED DESCRIPTION OF THE PREFERRED EMBODIMENT

Figure 1:
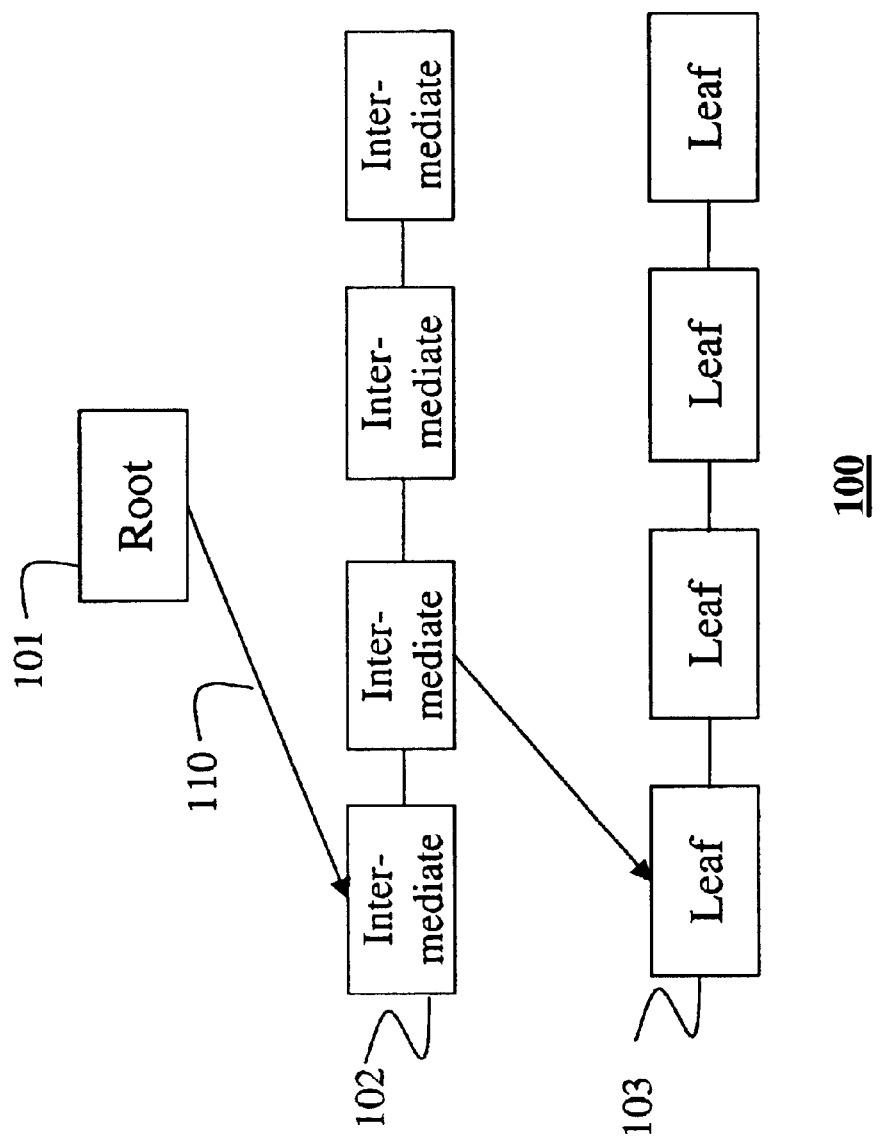
FIG. 1 is a diagram illustrating a data structure for a two-dimensional bi-tree in accordance with the present invention.
Figure 2:
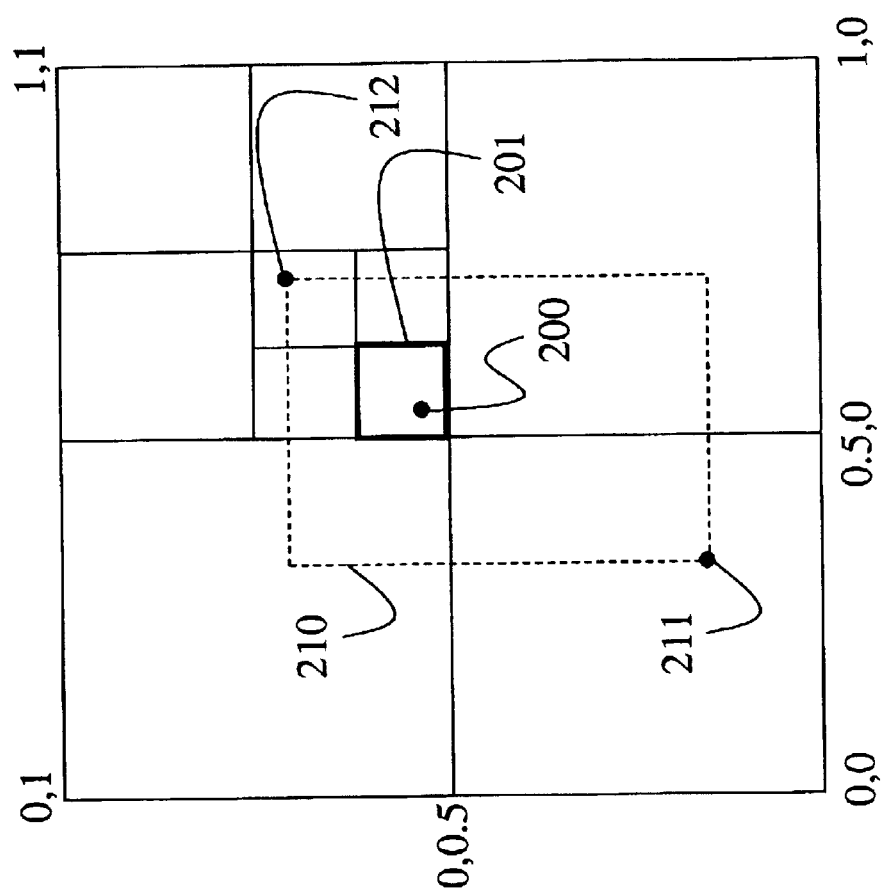
FIG. 2 is a diagram illustrating a spatial partitioning for a two-dimensional bi-tree in accordance with the present invention.
Figure 3:
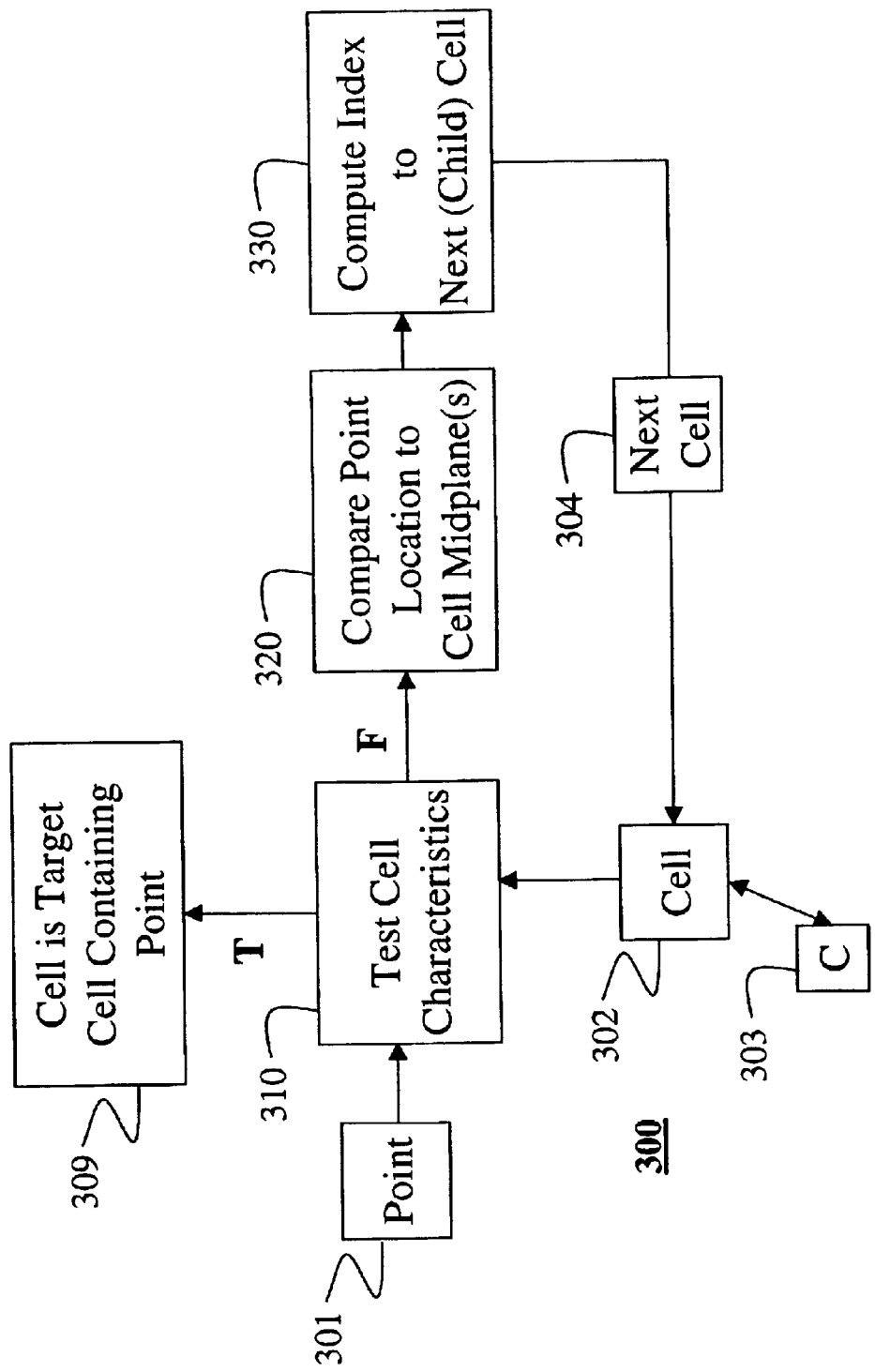
FIG. 3 is a diagram of a flow chart for a typical prior art point location method.
Figure 4:
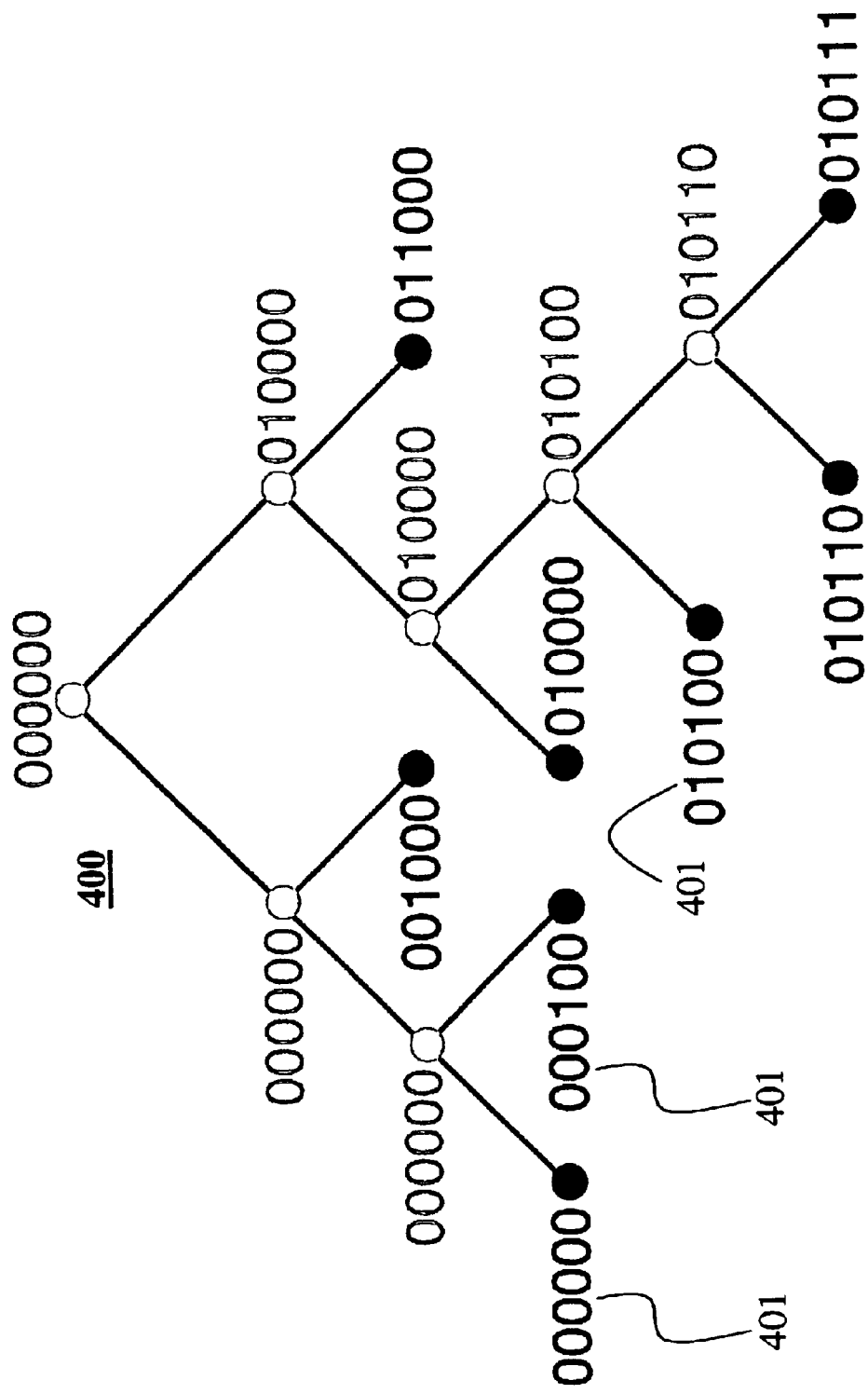
FIG. 4 is a diagram illustrating a hierarchical tree structure and associated locational codes for a one-dimensional bi-tree in accordance with the present invention.

FIG. 4 shows a hierarchical tree structure 400 and associated locational codes for a one-dimensional bi-tree. Locational codes 401 are used by a bi-tree traversal method according to the present invention. Each locational code 401 is represented in binary form in a data field with a bit size that is greater than or equal to the maximum number of levels in the tree, $N_{LEVELS}$. For example, each locational code for a bi-tree with up to eight levels can be represented by eight bits.

The bits in each locational code 401 are numbered from right (LSB) to left (MSB) starting from zero. Each bit in the locational code indicates a branching pattern at a corresponding level of the bi-tree, i.e., bit k represents the branching pattern at level k in the bi-tree. Unlike the prior art where locational codes are interleaved, we use separate locational codes for each dimension of the cell, e.g., a set of locational codes for each cell of a two-dimensional bi-tree, i.e., a quadtree, comprises both an x locational code and a y locational code.

Figure 5:
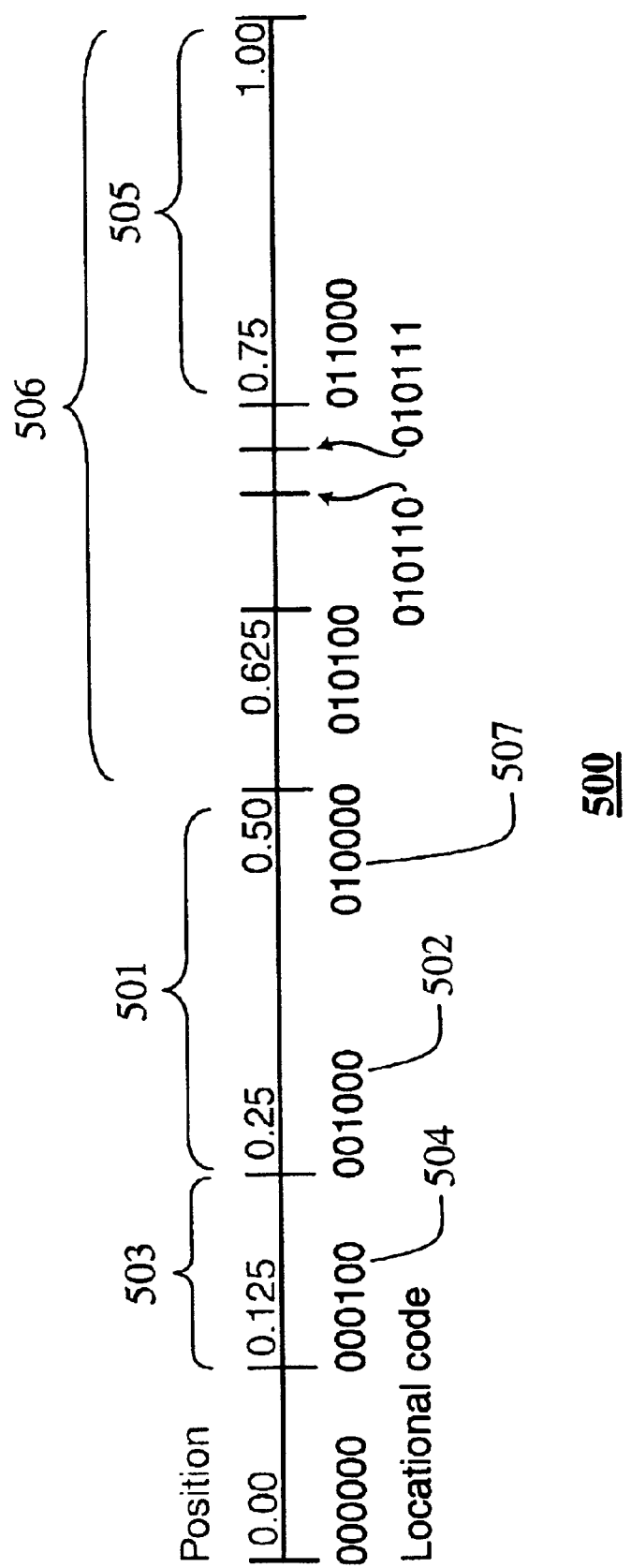
FIG. 5 is a diagram illustrating a spatial partitioning and associated locational codes for a one-dimensional bi-tree in accordance with the present invention.

The locational codes for a cell can be determined in two ways. A first method multiplies the value of each coordinate of the cell's minimum vertex by $2^{LEVEL_{ROOT}}$, e.g., $2^5=32$, and then represents the product in binary form. FIG. 5 illustrates a spatial partitioning and associated locational codes 500 for the one-dimensional bi-tree 400. For example, the cell 501, [0.25, 0.5), has locational code 502, binary(0.25*32)=binary(8)=001000.

A second method follows a branching pattern from the root cell to a given cell, setting each bit according to the branching pattern of a corresponding level. Starting by setting bit $LEVEL_{ROOT}$ to zero, the second method then sets each subsequent bit k to zero if a branching decision from level k+1 to k branches to the left, and to one if it branches to the right. For sparse bi-trees, lower order bits are set to zero if leaf cells are larger than a smallest possible cell.

In quadtrees, octrees, and higher dimensional bi-trees, locational codes for each dimension are determined separately from the value of the corresponding coordinate of the cell's minimum vertex (the first method) or from the left-right, bottom-top, (back-front, etc.) branching pattern used to reach the given cell from the root cell (the second method).

Several properties of these locational codes can be used to provide bi-tree traversal according to the present invention.

First, just as locational codes can be determined from branching patterns, branching patterns can be determined from locational codes. That is, a cell's locational code can be used to traverse the bi-tree from the root cell to a target cell by using the appropriate bit in each of the locational codes to index a corresponding child of each intermediate cell. As an advantage, our method avoids the costly Boolean comparisons of the prior art.

Second, the position of any point in $[0,1)^N$ can be converted into a set of locational codes by using the first method.

These properties enable point and region location according to the present invention as described below in greater detail. In addition, the locational codes of a cell's neighbors can be determined by adding and subtracting bit patterns to the cell's locational codes. This property is used to eliminate recursion and memory accesses for table lookup during neighbor searches.

Point Location

Figure 6:
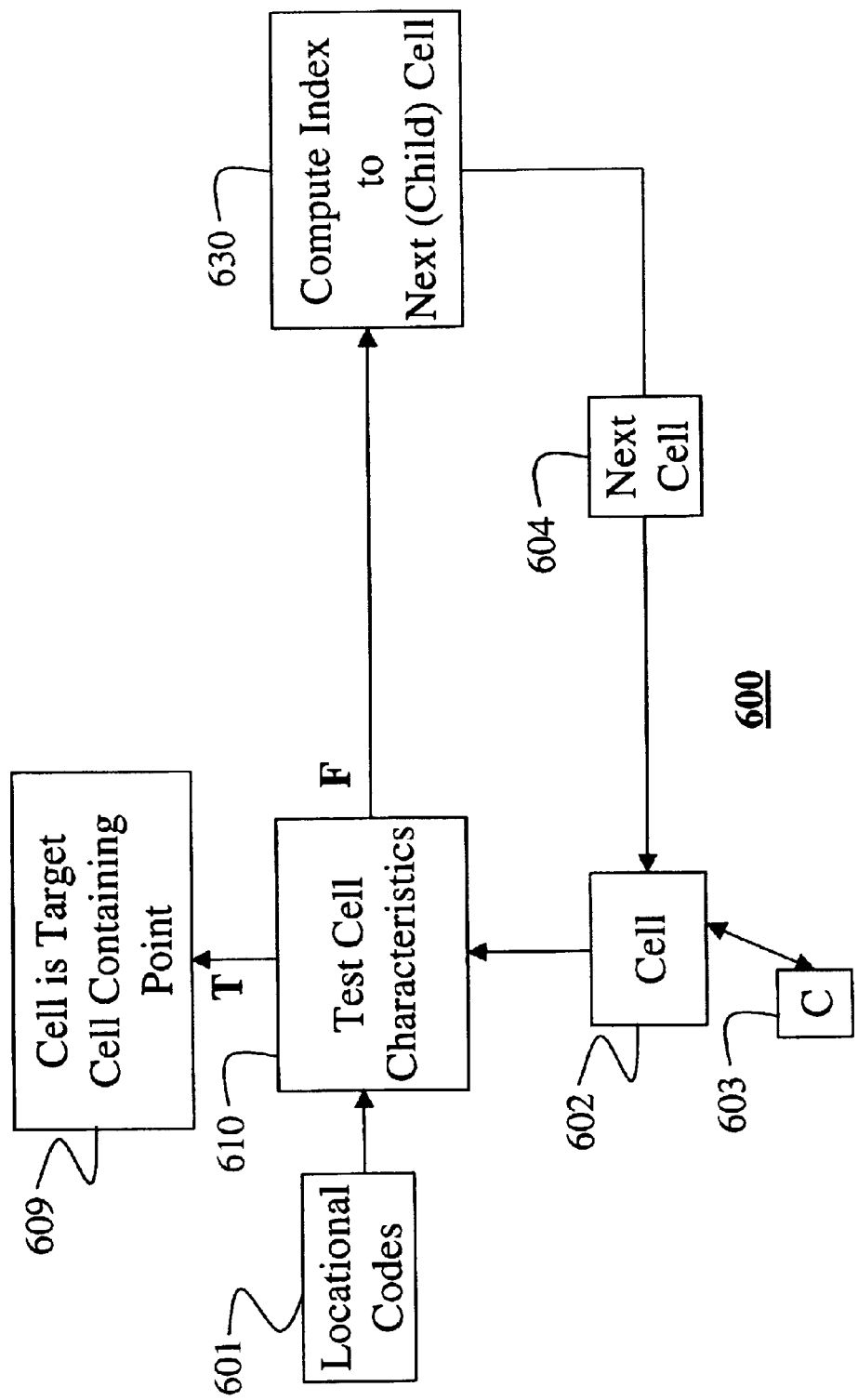
FIG. 6 is a diagram of a flow chart for point location according to the present invention.

As shown in FIG. 6, a point location operation, according to the invention, locates a leaf cell that contains a given point located in $[0,1)^N$ in a bi-tree defined over a region $[0,1]^N$.

A first step converts the values of the coordinates of the point's position to a set of locational codes 601 by multiplying each value by $2^{LEVEL_{ROOT}}$ and truncating the resultant products to integers. The integers are represented in binary form.

A second step selects a starting cell 602, e.g., the root cell. The characteristics 603 of the cell 602 are tested 610, e.g., "is the cell 602 a leaf cell?". If true, the cell 602 is a target cell 609 containing the point.

While false, at each level k in the bi-tree, the $(k-1)^{st}$ bits from each of the locational codes 601 are used to determine 630 an index to an appropriate next (child) cell 604 to be tested 610.

Note that all children of a cell are consecutively ordered to enable this indexing. The ordering can be done by storing the child cells or pointers to the child cells consecutively in a memory. When the indexed child cell has no children, the desired leaf cell has been reached and the point location operation is complete.

Unlike the prior art point location operation 300, our point location operation 600 does not require comparisons between the point position and mid-plane positions of each cell at each branching point. This eliminates N comparisons at each level during a traversal of an N-dimensional bi-tree.

For example, to locate a point in a level 0 cell of an eight-level octree, the prior art operation requires an additional 24=(3*8) comparisons to branch to the appropriate children of intermediate cells. These additional comparisons in the prior art operation exhibit mispredictions as described above.

Region Location

Region location finds a smallest cell or set of cells that encloses a given region. Our method finds a single smallest cell entirely enclosing a rectangular, axis-aligned bounding box.

Our method provides for region location in N-dimensional bi-trees. Our method first determines a size of a smallest enclosing cell. Then, a variation of the point location method described above is used to traverse the bi-tree from a root cell to the smallest enclosing cell.

We determine the size, i.e., level, of the smallest enclosing cell by XOR'ing each corresponding pair of locational codes (lc) of a minimum vertex $v_0$ and a maximum vertex $v_1$ defining the region to generate a binary code (bc), i.e., $bc=(lc_{v0}$ XOR $lc_{v1})$.

Each binary code is then searched from the left (MSB) to find the first "one" bit of the set of binary codes, indicating a first level below a root level where at least one of the pairs of locational codes differ. The level of the smallest enclosing cell is then equal to a bit number of the "zero" bit immediately preceding this "one" bit.

Given this level, our method then traverses the bi-tree downward from the root cell following the bit pattern of the locational codes of any of the region vertices, e.g., the minimum vertex, until a leaf cell is encountered OR a cell of the determined size is reached. This yields the desired enclosing (target) cell. We use the logical OR operator here to indicate either one or both conditions will terminate the traversal of the bi-tree.

Note that there are several methods for identifying the highest order "one" bit in the binary codes ranging from a simple shift loop to processor specific single instructions, which bit-scan a value, thereby eliminating the loop and subsequent comparisons.

As a first one-dimensional example, a region [0.31, 0.65) of the bi-tree 400 has left and right locational codes 001001 and 010101 respectively. By XOR'ing these location codes, a binary code 011100 is obtained, with a first "one" bit from the left (MSB) encountered at bit position four (recall that bit positions are numbered from zero starting at the right-most, LSB, bit), so that the level of a smallest enclosing cell is five, i.e., the enclosing target cell of the region [0.31, 0.65) is the root cell.

As a second one-dimensional example, a region [0.31, 0.36) of the bi-tree 400 has locational codes 001001 and 001010. The XOR step yields 000011, with a first "one" bit from the left encountered at bit position one, so that the level of a smallest enclosing cell is two. The smallest enclosing cell is then found by traversing the bi-tree 400 downward from the root cell following the left locational code 001001, until the target level 3 leaf cell 501, [0.25, 0.50), is encountered.

Neighbor Searches

Neighbor searching finds a cell adjacent to a given cell in a specified direction, e.g., left, top, and top-left. Several variations exist, including finding a neighbor with a common vertex, edge, or face, finding neighbors of a same size or larger than the given cell, or finding all leaf cell neighbors of the given cell.

In order to determine neighbors of the given cell, we first note that bit patterns of locational codes of two neighboring cells differ by a binary distance between the two cells. For example, a left boundary of every right neighbor of a cell, including intermediate and leaf cells, is offset from the cell's left boundary by the cell's size. Hence, the locational code corresponding to the x coordinate, i.e., the cell's x locational code, of every right neighbor of a cell can be determined by adding the binary form of the cell's size to the cell's x locational code.

The binary form of a cell's size is determined from the cell's level, i.e., cellSize=binary($2^{cellLevel}$). Hence, the x locational code for a cell's right neighbor is the sum of the cell's x locational code and cellSize.

As an example, a cell 501, [0.25, 0.5), has a locational code 502, 001000, and is at level three. Hence, the x locational code of a neighbor touching its right boundary is 001000+binary($2^3$)=001000+001000=010000.

Determining the x locational codes of a cell's left neighbors is more complicated. Because the cell's left neighbors' sizes are unknown, the correct binary offset between the cell's x locational code and the x locational codes of its left neighbors are also unknown. However, a smallest possible left neighbor has level 0. Hence, a difference between the x locational code of a cell and the x locational code of the cell's smallest possible left neighbor is binary($2^0$), i.e., the smallest possible left neighbor's x locational code is cell's x locational code—binary(1).

Furthermore, the left boundary of this smallest possible left neighbor is located between the left and right boundaries of every left neighbor of the cell, including leaf cells larger than the smallest possible left neighbor and intermediate cells. Hence, a cell's left neighbors can be located by traversing the bi-tree downward from the root cell using the x locational code of this smallest possible left neighbor and stopping when a neighbor cell of a specified level is reached, OR a leaf cell is encountered.

As an example, a smallest possible left neighbor of a cell 501, [0.25, 0.5), has x locational code 001000−000001=000111. Traversing the bi-tree 400 downwards from the root cell using this locational code, and stopping when a leaf cell is reached yields a cell 503, [0.125, 0.25), with a locational code 504, 000100, as the cell's left neighbor.

For N-dimensional bi-trees, a neighbor is located by following branching patterns of a set of N locational codes to the neighbor until a leaf cell is encountered OR a specified maximum tree traversal level is reached. The N locational codes to the neighbor are determined from a specified direction. The specified direction determines a corresponding cell boundary. In a two-dimensional bi-tree, the x locational code of a right edge neighbor is determined from the cell's right boundary and the x and y locational codes of a top-right vertex neighbor are determined from the cell's top and right boundaries.

For example, in a two-dimensional bi-tree, i.e., a quadtree, a right edge neighbor of size greater than or equal to a given cell is located by traversing downward from the root cell using the locational codes to the neighbor comprising the x locational code of the given cell's right boundary and the y locational code of the given cell until either a leaf cell OR a cell of the same level as the given cell is reached.

As a second two-dimensional example, a given cell's bottom-left leaf cell vertex neighbor is located by traversing the two-dimensional bi-tree, i.e., the quadtree, downward from the root cell using the x locational code of the given cell's smallest possible left neighbor and the y locational code of the given cell's smallest possible bottom neighbor until a leaf cell is encountered.

After the locational codes of a desired neighbor have been determined, the desired neighbor can be found by traversing the bi-tree downward from the root cell. However, it can be more efficient to first traverse the bi-tree upward from the given cell to a smallest common ancestor of the given cell and its neighbor, and then to traverse the bi-tree downward from the smallest common ancestor to the neighbor, see H. Samet, "*Applications of Spatial Data Structures: Computer Graphics, Image Processing, GIS*," Addison-Wesley, Reading, Mass., 1990.

Fortunately, our locational codes also provide an efficient means for determining this smallest common ancestor. Assuming a one-dimensional bi-tree, the neighbor's locational code is determined, as described above, from the given cell and the given direction. The given cell's locational code is then XOR'ed with the neighbor's locational code to generate a difference code. Next, the bi-tree is traversed upward from the given cell until a first level is reached where a corresponding bit in the difference code is 0, indicating a first branching point where the two locational codes are the same. We call this the stopping level. The cell reached by this upwards traversal to the stopping level is the smallest common ancestor of the given cell and its neighbor.

In N dimensions, the N locational codes of a cell are XOR'ed with N corresponding locational codes of its neighbor generating N difference codes. The highest level cell reached by the upward traversal using the N difference codes is the smallest common ancestor.

As a first example, a difference code for a level 3 cell 501, [0.25, 5), in the one-dimensional bi-tree 400 and its right neighbor is 001000^010000=011000. Traversing the bi-tree upward from level 3 considers bits in this difference code to the left of bit 3. A first 0 bit is reached at LEVEL$_{ROOT}$, so a smallest common ancestor of cell 501 and its right neighbor is the root cell.

As a second example, a difference code for a level 3 cell 505, [0.75, 1), in the one-dimensional bi-tree 400 and its left neighbor is 011000^010111=00111. Examining bits to the left of bit 3 yields a first 0 at bit 4, corresponding to a level 4 cell. Hence, a smallest common ancestor of the cell 505 and its left neighbor is the cell's parent cell 506, which has a locational code 507, 010000.

Depending on the application, several different variations of neighbor searches might be required, e.g., finding a smallest left neighbor of size at least as large as the given cell and finding all of the leaf cell neighbors touching a specified vertex of the given cell.

There are several advantages of the neighbor finding method according to the present invention over traditional methods. First, because we treat each dimension independently, our method works in any number of dimensions. In contrast, prior art methods use table lookups that work only for two- and three-dimensional bi-trees. Construction of these tables has relied on being able to visualize spatial relationships in two- and three-dimensions; extending these tables to higher dimensions is thus exceedingly difficult, error prone, and tedious to verify. In fact, although higher-dimensional bi-trees are of great utility in fields such as computer vision, scientific visualization, and color science, tables for neighbor searching in these higher dimensional bi-trees are not known.

Second, our method trades off traditional table lookups, which require memory accesses, for simple register-based computations in the form of bit manipulations. This is advantageous in modern system architectures where processor speeds exceed memory speeds. Even in modern systems with fast cache memory, the application data and the table data compete for the cache in many practical applications, forcing frequent reloading of the table data from memory, thus degrading the performance of table-based prior art methods.

In addition, prior art neighbor searching methods and tables have been devised for a limited variety of neighborhood searches. Traditional neighbor searches require different methods for face, edge, and vertex neighbors and "vertex neighbors are considerably more complex," see H. Samet, "*Applications of Spatial Data Structures: Computer Graphics, Image Processing, GIS*," Addison-Wesley, Reading, Mass., 1990. In contrast, our method uses a single approach for all varieties of neighbor searching. Furthermore, prior art tables are specialized for a given cell enumeration and must be re-determined for different cell labeling conventions. Generating tables for different conventions and different types of neighbor searches is difficult, error prone, and tedious to verify.

Finally, our neighbor searching method is inherently non-recursive and requires fewer Boolean operations than traditional methods. In contrast, traditional methods for neighbor searching are inherently recursive and unraveling the recursion is non-trivial. A non-recursive neighbor searching method for quadtrees and octrees is described by Bhattacharya in "*Efficient Neighbor Finding Algorithms in Quadtree and Octree,*" M. T. Thesis, Dept. Comp. Science and Eng., India Inst. Technology, Kanpur, 2001. However, that method is limited to finding neighbors of the same size or larger than a cell. In addition, like Samet's, that method requires table-based traversal to determine the appropriate neighbor. Hence, that method suffers from the same limitations of traditional neighbor searching methods as described above.

Ray Tracing

Ray tracing a three-dimensional graphical object stored in a three-dimensional bi-tree, i.e., an octree, requires determination of an ordered sequence of leaf cells along a ray passing through the bi-tree, testing each non-empty leaf cell for ray-surface intersections, and processing the ray-surface intersections.

Three-dimensional ray tracing is used extensively in computer graphics. In addition, there are numerous applications for the determination of an ordered sequence of leaf cells along a ray passing through an N-dimensional bi-tree in fields such as telecommunications, robotics, and computer vision.

Figure 7:
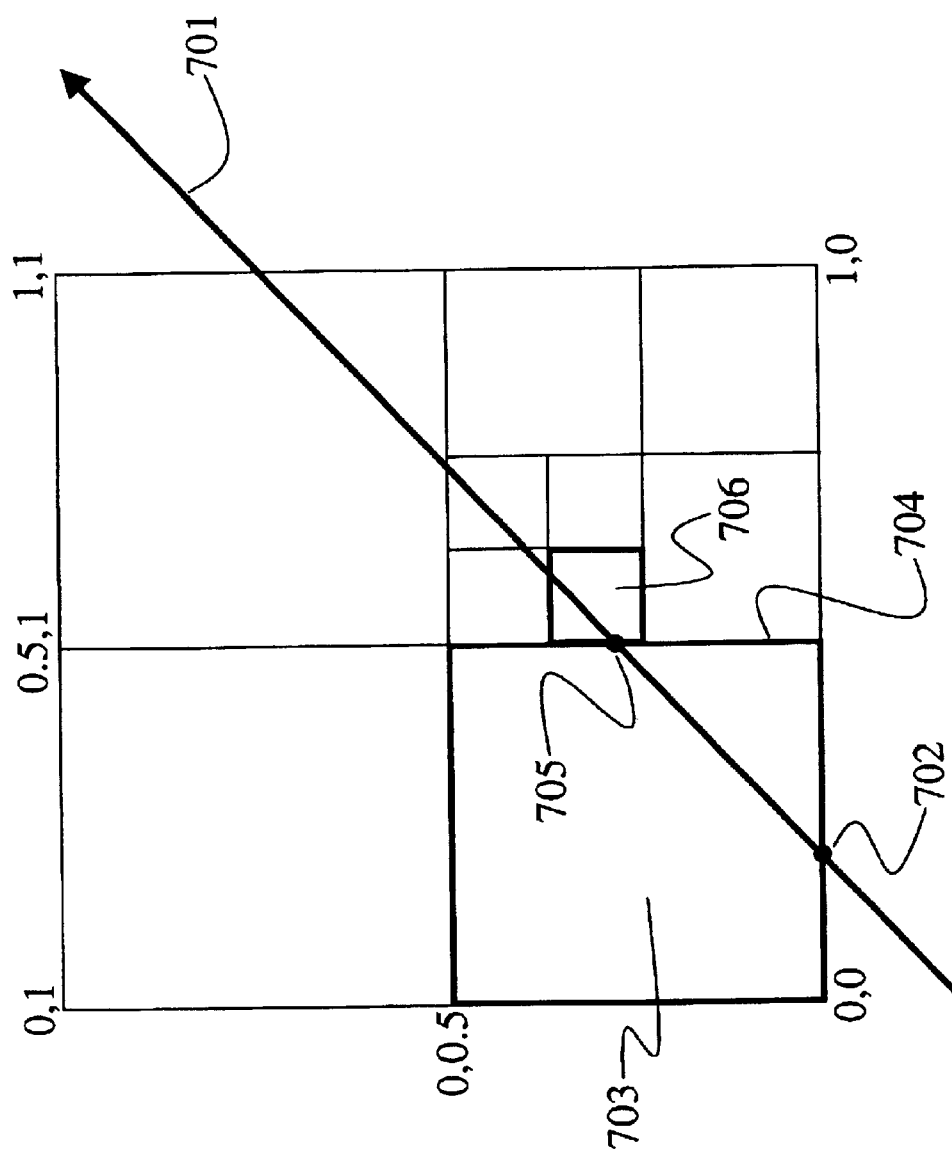
FIG. 7 is a diagram illustrating a ray intersecting a two-dimensional bi-tree in accordance with the present invention.

As illustrated in FIG. 7, according to the present invention, a first step determines a point 702 where a ray 701 first enters a two-dimensional bi-tree. A second step determines a leaf cell 703 and its locational codes using our point location method (described above) for the point 702. A third step tests the cell 703 for a ray stopping condition, e.g., "is there a ray-surface intersection in the cell?".

If the test fails, locational codes of a next cell 706 along the ray 701 are determined in two steps from the locational codes of the cell 703, a direction of the ray 701, and a size of the cell 703.

The first step determines a subset of coordinates of an exit point 705 whose values are equal to the values of corresponding coordinates in the maximum or minimum vertices of the cell 703. This subset depends on where the ray 701 exits the cell 703, e.g., the subset consists of the x coordinate for the exit point 705 because the ray 701 exits the cell 703 on its right edge 704 (where $x=x_{MAX}(cell_{703})$). This subset of coordinates determines a corresponding subset of locational codes to the next cell 706 that are then determined from the locational codes and size of the cell 703 according to neighbor searching methods of the present invention described above.

The second step determines the remaining locational codes to the next cell 706 from the locational codes determined in the first step and an equation of the ray 701. Finally, the locational codes to the next cell 706 are used to traverse up the bi-tree to a common ancestor of the cells 703 and 706 and back down to the neighbor 706 according to neighbor searching methods of the present invention described above.

This process of determining next cells along the ray 701 is repeated to determine an ordered sequence of leaf cells along the ray 701 until the ray stopping condition is satisfied.

Our method can be applied to both top-down and bottom-up tree traversal approaches for ray tracing while avoiding the Boolean operations, recursion, and incremental stepping along the ray in increments proportional to a smallest possible leaf cell, used in the prior art.

Effect of the Invention

The invention provides a method for point location, region location, neighbor searching, and ray-tracing for bi-trees which is simple, efficient, works in any number of dimensions, and is inherently non-recursive. The method according to the invention significantly reduces the number of Boolean operations with poor predictive behavior and does not require accessing memory as necessitated by table lookups.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for traversing a bi-tree stored in a memory to locate application specific data stored in the memory and associated with the bi-tree, wherein the bi-tree comprises a spatial partitioning of an N-dimensional space into a hierarchy of cells, wherein each cell, starting from a root cell enclosing the N-dimensional space, is successively and conditionally partitioned into $2^N$ child cells along N midplanes of the cell, and wherein each cell has associated characteristics comprising the application specific data and child cells are indexed directly from a parent cell, comprising:

specifying a set of locational codes;

specifying a cell;

testing whether the characteristics of the cell satisfy a termination condition and applying only an arithmetic operation on the set of locational codes to directly index a next cell to be tested while false; and otherwise identifying the cell as a target cell if true; and retrieving the application specific data of the target cell from the memory.

2. The method of claim 1 wherein the step specifying the locational codes further comprises:

determining N coordinates of an N-dimensional point in the N-dimensional space;

multiplying, for each coordinate, a value of the coordinate by $2^k$ where k is a level of the root cell of the bi-tree to produce a result; and converting the result to a binary form to specify the corresponding locational code.

3. The method of claim 1 wherein each of the locational codes in the set is determined from a corresponding coordinate of a point in the N-dimensional space, the cell is the root cell of the bi-tree, and the termination condition is satisfied when the cell is a leaf cell.

4. The method of claim 3 further comprising:

representing an N-dimensional rectangular region containing the point by a minimum vertex $v_0$ and a maximum vertex $v_1$;

satisfying the termination condition when a leaf cell is reached OR when a termination level of the bi-tree is reached, wherein the termination level is determined from the locational codes of the minimum vertex $v_0$ and the maximum vertex $v_1$ to find a smallest cell enclosing the N-dimensional rectangular region.

5. The method of claim 4 wherein the determining of the termination level comprises:

determining, for each coordinate of the N-dimensional space, a candidate level, the determining of the candidate levels further comprising:

determining a corresponding locational code $lc_{v0}$ from the coordinate of the minimum vertex;

determining a corresponding locational code $lc_{v1}$ from the coordinate of the maximum vertex;

determining a binary code $bc=(lc_{v0}$ XOR $lc_{v1})$;

determining a first one-bit in the binary code bc from the left MSB;

setting the candidate level to a bit number of a 0-bit immediately to the left of the first one-bit;

setting the termination level to a maximum of the candidate levels.

6. The method of claim 1 wherein the locational codes are determined by an arithmetic operation on a given cell and a direction from the given cell and wherein the termination condition is satisfied when a leaf cell is reached OR when a termination level is reached in the bi-tree to find a neighboring cell of the given cell in the direction.

7. The method of claim 6 wherein the cell is the root cell of the bi-tree.

8. The method of claim 6 wherein the cell is a common ancestor of the given cell and the neighboring cell.

9. The method of claim 6 wherein the arithmetic operation further comprises:

determining, for each coordinate of the N-dimensional space, a corresponding locational code $lc_{cell}$ of the given cell;

adding, for each coordinate of the N-dimensional space, a size of the given cell to the corresponding locational code $lc_{cell}$ if a corresponding coordinate value of a minimum vertex of the neighboring cell is equal to a corresponding coordinate value of a maximum vertex of the cell; and subtracting, for each coordinate of the N-dimensional space, a size from the corresponding locational code $lc_{cell}$ if a corresponding coordinate value of a maximum vertex of the neighboring cell is equal to a corresponding coordinate value of a minimum vertex of the cell.

10. The method of claim 9 wherein the size is a size of a smallest cell in the bi-tree.

11. The method of claim 8 wherein the determining of the common ancestor comprises:

determining a candidate level for each coordinate of the N-dimensional space, the determining of the candidate level comprising:

determining a locational code $lc_{cell}$ of the given cell for the coordinate;

determining a locational code lc of the neighboring cell for the coordinate;

determining a binary code, $bc=(lc$ XOR $lc_{cell})$;

determining a bit $b_{cell}$ in bc whose bit number is a level of the given cell;

determining a first zero-bit $b_{candidate}$ in bc that is to the left of $b_{cell}$;

determining the candidate level as the bit number of the $b_{candidate}$;

setting a stopping level to a maximum of the candidate levels; and determining the common ancestor by following parent pointers upward from the given cell until the stopping level is reached.

12. The method of claim 2 wherein the N-dimensional point is a minimum vertex of an arbitrary cell in the bi-tree to specify the N locational codes of the arbitrary cell.

13. The method of claim 2 further comprising:

tracing a ray through the bi-tree to specify a plurality of points where the ray intersects selected cells in the bi-tree;

determining, for each point, a set of locational codes; and identifying, for each set of locational codes, the corresponding target cell that is a leaf cell.

14. The method of claim 13 wherein the selected cells are leaf cells for a bottom-up traversal of the bi-tree.

15. The method of claim 13 wherein the identifying of the target cells terminates when a ray stopping condition is satisfied.

16. The method of claim 13 wherein the target cells are identified in an order that the ray is traced.

17. The method of claim 13 wherein the cell is the root cell of the bi-tree, and a first set of locational codes is determined for an entry point where the ray enters the bi-tree, and each next set of locational codes is determined from an exit point where the ray exits the target cell.

18. The method of claim 17 wherein, for each next set of locational codes, the cell is a common ancestor of the target cell and a neighboring cell adjacent to the exit point where the ray exists the target cell.

19. The method of claim 17 wherein the next set of location codes is determined by a second arithmetic operation on locational codes of the selected cells of the bi-tree.

20. The method of claim 19 wherein the second arithmetic operation for determining the next set of locational codes comprises:

determining a subset of coordinates of the exit point whose values are equal to the corresponding coordinate values in the maximum and minimum vertices of the target cell;

determining, for each coordinate in the subset, a corresponding locational code of the next set of locational codes, further comprising:

determining a corresponding locational code $lc_{cell}$ of the target cell;

performing an arithmetic operation on $lc_{cell}$ and a direction of the ray to determine the corresponding locational code; and determining the locational codes of the next set of locational codes that are not in the subset by performing an arithmetic operation on the ray and the subset of locational codes.

21. The method of claim 15 wherein the ray stopping condition is satisfied when the ray intersects a graphical element stored in the target cell.

22. The method of claim 15 wherein the ray stopping condition is satisfied when the ray exits the bi-tree.

23. The method of claim 1 where N is an integer greater than zero.

24. A system for traversing a bi-tree stored in a memory to locate application specific data stored in the memory and associated with the bi-tree, wherein the bi-tree comprises a spatial partitioning of an N-dimensional space into a hierarchy of cells, wherein each cell, starting from a root cell enclosing the N-dimensional space, is successively and conditionally partitioned into $2^N$ child cells along N midplanes of the cell, and wherein each cell has associated characteristics comprising the application specific data and child cells are indexed directly from a parent cell, comprising:

means for specifying a set of locational codes;

means for specifying a cell;

means for testing whether the characteristics of the cell satisfy a termination condition and applying only an arithmetic operation on the set of locational codes to directly index a next cell to be tested while false; and otherwise means for identifying the cell as a target cell if true; and means for retrieving the application specific data of the target cell from the memory.

* * * * *